United States Patent
Asano et al.

(10) Patent No.: US 7,432,603 B2
(45) Date of Patent: Oct. 7, 2008

(54) SEMICONDUCTOR ENCAPSULATING EPOXY RESIN COMPOSITION AND SEMICONDUCTOR DEVICE

(75) Inventors: Eiichi Asano, Gunma-ken (JP); Toshio Shiobara, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 355 days.

(21) Appl. No.: 11/138,378

(22) Filed: May 27, 2005

(65) Prior Publication Data

US 2005/0267236 A1 Dec. 1, 2005

(30) Foreign Application Priority Data

May 31, 2004 (JP) ............................. 2004-160551

(51) Int. Cl.
*H01L 23/29* (2006.01)
*C08L 63/00* (2006.01)
*B32B 27/04* (2006.01)
*B32B 27/20* (2006.01)
*B32B 27/38* (2006.01)
*H01L 21/56* (2006.01)

(52) U.S. Cl. .................. 257/789; 257/793; 257/795; 257/E23.121; 428/413; 428/416; 428/418; 438/127; 523/457; 523/458

(58) Field of Classification Search ................. 428/413, 428/414, 415, 416, 417, 418; 438/127; 523/457, 523/458, 459, 460; 257/787, 788, 789, 793, 257/795

See application file for complete search history.

(56) References Cited

U.S. PATENT DOCUMENTS

2002/0197468 A1* 12/2002 Sinko .................. 428/336
2003/0197159 A1* 10/2003 Kinose et al. ............. 252/609

FOREIGN PATENT DOCUMENTS

JP 11-92545 A 4/1999

\* cited by examiner

*Primary Examiner*—Michael J Feely
(74) *Attorney, Agent, or Firm*—Birch, Stewart, Kolasch & Birch, LLP

(57) ABSTRACT

In an epoxy resin composition comprising (A) an epoxy resin, (B) a curing agent, (C) an inorganic compound, and (D) an inorganic filler, the inorganic compound (C) is an oxide of metal elements at least one of which is a metal element of Group II in the Periodic Table having a second ionization potential of up to 20 eV, typically $Zn_2SiO_4$, $ZnCrO_4$, $ZnFeO_4$ or $ZnMoO_4$. When used for semiconductor encapsulation, the epoxy resin composition is highly reliable and cures into a product which is effective for minimizing electrical failure such as defective insulation due to a copper migration phenomenon.

3 Claims, No Drawings

SEMICONDUCTOR ENCAPSULATING EPOXY RESIN COMPOSITION AND SEMICONDUCTOR DEVICE

CROSS-REFERENCE TO RELATED APPLICATION

This non-provisional application claims priority under 35 U.S.C. §119 (a) on Patent Application No. 2004-160551 filed in Japan on May 31, 2004, the entire contents of which are hereby incorporated by reference.

This invention relates to an epoxy resin composition for semiconductor encapsulation which is highly reliable and cures into a product which is effective for minimizing electrical failure such as defective insulation due to a migration phenomenon when used for the encapsulation of a semiconductor device using a copper or copper alloy frame with fine pitch wiring. It also relates to a semiconductor device encapsulated with a cured product of the composition.

BACKGROUND OF THE INVENTION

In concert with the current trend of semiconductor devices toward higher density mounting and reductions of size, weight and profile, the number of wirings is increasing, requiring that the pitch between gold wires or between leads be finer. In concert with the higher performance speed of semiconductor devices, on the other hand, copper or copper alloy having good heat dissipation characteristics is mainly used as the lead frame material for suppressing the heat generation during operation.

For the advanced semiconductor devices, copper or copper alloy frames with fine pitch wiring become the main stream. These semiconductor devices are known to have the drawback that a short distance between leads causes a migration phenomenon to the copper used as the wiring or electrode, often resulting in electrical failures such as increased leakage current flow and short-circuiting between leads.

As used herein, the migration phenomenon means that moisture absorption causes the copper on the anode side of a semiconductor device to be ionized under an electric field, which results in dendritic precipitation of copper on the cathode side through redox reaction, detracting from insulation.

JP-A 11-092545 discloses an electronic component-encapsulating epoxy resin composition comprising an epoxy resin, a curing agent, and an inorganic filler.

SUMMARY OF THE INVENTION

An object of the invention is to provide an epoxy resin composition for semiconductor encapsulation which is highly reliable and cures into a product which is effective for minimizing electrical failure such as defective insulation due to a migration phenomenon when used for the encapsulation of a semiconductor device using a copper or copper alloy frame with fine pitch wiring; and a semiconductor device encapsulated with a cured product of the composition.

The inventors have discovered that a semiconductor-encapsulating epoxy resin composition comprising (A) an epoxy resin, (B) a curing agent, (C) an inorganic compound, and (D) an inorganic filler, when an inorganic compound having the formula (1) defined below is used as component (C), is highly reliable, and cures into a product which is effective for minimizing electrical failure such as defective insulation due to a migration phenomenon when used for the encapsulation of a semiconductor device using a copper or copper alloy frame with fine pitch wiring.

The present invention provides a semiconductor-encapsulating epoxy resin composition comprising (A) an epoxy resin, (B) a curing agent, (C) an inorganic compound, and (D) an inorganic filler, the inorganic compound (C) having the formula (1):

$$M1_xM2_yO_z \qquad (1)$$

wherein each of M1 and M2 is a metal element, at least one of M1 and M2 is a metal element of Group II in the Periodic Table having a second ionization potential of up to 20 eV, x, y and z each are an integer of 1 to 20.

Also contemplated herein is a semiconductor device encapsulated with a cured product of the epoxy resin composition.

The semiconductor-encapsulating epoxy resin composition of the invention is highly reliable. When it is used for the encapsulation of a semiconductor device using a copper or copper alloy frame with fine pitch wiring, it cures into a product which is effective for minimizing electrical failure such as defective insulation due to a copper ion migration phenomenon. A semiconductor device encapsulated with a cured product of the epoxy resin composition undergoes little migration and remains electrically reliable.

DETAILED DESCRIPTION OF THE INVENTION

Component (A) in the epoxy resin composition of the invention is an epoxy resin which is not critical. Illustrative examples of suitable epoxy resins include novolac type epoxy resins, cresol novolac type epoxy resins, triphenolalkane type epoxy resins, aralkyl type epoxy resins, biphenyl skeleton-containing aralkyl type epoxy resins, biphenyl type epoxy resins, dicyclopentadiene type epoxy resins, heterocyclic epoxy resins, naphthalene ring-containing epoxy resins, bisphenol A type epoxy compounds, bisphenol F type epoxy compounds, and stilbene type epoxy resins. These epoxy resins may be employed alone or in combination of two or more. In the practice of the invention, brominated epoxy resins which are useful flame retardants may be compounded.

Component (B) is a curing agent which is not critical as well. Most often, phenolic resins are used as the curing agent. Illustrative examples of typical phenolic resin curing agents include phenolic novolac resins, naphthalene ring-containing phenolic resins, phenol aralkyl type phenolic resins, aralkyl type phenolic resins, biphenyl skeleton-containing aralkyl type phenolic resins, biphenyl type phenolic resins, dicyclopentadiene type phenolic resins, alicyclic phenolic resins, heterocyclic phenolic resins, bisphenol-type phenolic resins such as bisphenol A and bisphenol F type phenolic resins. Also included are acid anhydrides such as methyltetrahydrophthalic anhydride, methylhexahydrophthalic anhydride, hexahydrophthalic anhydride and Methyl-Himic Anhydride (5-norbornene-2,3-dicarboxylic anhydride). These curing agents may be employed alone or in combination of two or more.

The proportion of epoxy resin (A) and curing agent (B) is not particularly limited. When a phenolic resin is used as the curing agent, they are preferably used in such amounts that a molar ratio of phenolic hydroxyl groups in curing agent (B) to epoxy groups in epoxy resin (A) is from 0.5 to 1.5, and especially from 0.8 to 1.2. If the molar ratio of phenolic hydroxyl groups to epoxy groups is less than 0.5 or more than 1.5, insufficient cure may occur.

The resin composition of the present invention is characterized in that component (C) comprises an inorganic compound having the formula (1):

$$M1_xM2_yO_z \tag{1}$$

wherein each of M1 and M2 is a metal element, at least one of M1 and M2 is a metal element of Group II in the Periodic Table having a second ionization potential of up to 20 eV, x, y and z each are an integer of 1 to 20.

Although the invention is not bound to the theory, these inorganic compounds are effective for preventing copper ions from migration for the reason that when copper is ionized, ion exchange reaction takes place between copper ions and ions of the Group II metal element having a second ionization potential of up to 20 eV, which inhibits copper ions from precipitating as copper on the cathode side through redox reaction.

Examples of the metal element of Group II in the Periodic Table having a second ionization potential of up to 20 eV include Be, Mg, Ca, Zn, Sr, Cd, Ba, Hg, and Ra, with Mg, Ca, Zn and Sr being preferred.

Specifically, the second ionization potential of Group II metal elements is, for example, 15.031 eV for Mg, 11.868 eV for Ca, 17.96 eV for Zn, and 11.027 eV for Sr, while Cu has a second ionization potential of 20.29 eV. See Chemical Handbook—Basic II—, Maruzen, 1966.

The inorganic compound of formula (1) is not particularly limited as long as it is composed of a metal element of Group II in the Periodic Table having a second ionization potential of up to 20 eV and a different or similar metal element. Typical examples of the inorganic compound of formula (1) include $Mg_2SiO_4$, $MgWO_4$, $MgFe_2O_4$, $MgIn_2O_4$, $CaSeO_4$, $Ca_2SiO_4$, $CaTiO_3$, $CaCrO_4$, $CaMoO_4$, $CaWO_4$, $Zn_2SiO_4$, $ZnCrO_4$, $ZnFeO_4$, $ZnMoO_4$, and $SrCrO_4$. Inter alia, $Zn_2SiO_4$, $ZnCrO_4$, $ZnFeO_4$, and $ZnMoO_4$ are preferred.

The inorganic compound is preferably in particulate form having an average particle size of 0.1 to 10 μm, more preferably 0.2 to 5 μm. Particles with an average particle size of less than 0.1 μm may be less dispersible in a resin composition, which thus has reduced rheology. An average particle size of more than 10 μm may fail to provide a satisfactory ion exchange function with copper ions. It is noted that the average particle size is determined as a weight average value or median diameter using a particle size distribution instrument relying on the laser light diffraction method.

Also preferably, the inorganic compound has a specific surface area of 1 to 20 $m^2/g$, more preferably 3 to 18 $m^2/g$, as measured by the BET method. A specific surface area of less than 1 $m^2/g$ may fail to provide a satisfactory ion exchange function with copper ions. Particles with a specific surface area of more than 20 $m^2/g$ may be less dispersible in a resin composition, which has reduced rheology.

For improved dispersibility, these inorganic compounds may be used after they are previously borne on surfaces of inorganic particles, for example, oxides such as silica, talc, alumina, zinc oxide and titanium oxide, and hydroxides such as aluminum hydroxide and magnesium hydroxide.

The inorganic compound (C) is preferably present in an amount of 1 to 100 parts by weight, more preferably 1 to 50 parts by weight per 100 parts by weight of the epoxy resin and the curing agent combined. Less than 1 part by weight of the inorganic compound may be ineffective for preventing copper ions from migration. With more than 100 parts by weight of the inorganic compound, there are present too much anions derived therefrom, which rather can detract from reliability.

Component (D) in the resin composition of the invention is an inorganic filler which may be any suitable one commonly used in epoxy resin compositions. Illustrative examples include silicas such as fused silica and crystalline silica, alumina, silicon nitride, aluminum nitride, boron nitride, titanium oxide, and glass fibers. No particular limit is imposed on the average particle size and shape of these inorganic fillers. For moldability and fluidity, spherical fused silica having an average particle size of 5 to 40 μm is especially preferred.

The amount of the inorganic filler (D) loaded is preferably 400 to 1,200 parts, more preferably 500 to 1,000 parts by weight per 100 parts by weight of the epoxy resin and the curing agent combined. A composition with less than 400 parts by weight of the inorganic filler may have a greater coefficient of expansion, which can cause increased stress to the semiconductor device. A composition with more than 1,200 parts by weight of the inorganic filler may have too high a viscosity to mold.

The inorganic filler used herein is preferably surface treated beforehand with a coupling agent such as a silane coupling agent or a titanate coupling agent in order to increase the bonding strength between the resin and the inorganic filler. The preferred coupling agents are silane coupling agents including epoxy silanes such as γ-glycidoxypropyltrimethoxysilane, γ-glycidoxypropylmethyldiethoxysilane, and β-(3,4-epoxycyclohexyl)ethyltrimethoxysilane; amino silanes such as N-β-(aminoethyl)-γ-aminopropyltrimethoxysilane, γ-aminopropyltriethoxysilane, and N-phenyl-γ-aminopropyltrimethoxysilane; and mercapto silanes such as γ-mercaptosilane. No particular limitation is imposed on the amount of coupling agent used for surface treatment or the method of surface treatment.

In the practice of the invention, a curing accelerator is preferably used to promote the curing reaction between the epoxy resin (A) and the curing agent (B). The curing accelerator may be any suitable substance that promotes the curing reaction. Illustrative, non-limiting examples of curing accelerators that may be used include phosphorus compounds such as triphenylphosphine, tributylphosphine, tri(p-methylphenyl)phosphine, tri(nonylphenyl)phosphine, triphenylphosphine triphenylborane, and tetraphenylphosphine tetraphenylborate; tertiary amine compounds such as triethylamine, benzyldimethylamine, α-methylbenzyldimethylamine, and 1,8-diazabicyclo[5.4.0]undecene-7; and imidazole compounds such as 2-methylimidazole, 2-phenylimidazole, and 2-phenyl-4-methylimidazole. The curing accelerator is desirably blended in an amount of about 0.1 to 10 parts, more desirably about 0.5 to 5 parts by weight per 100 parts by weight of components (A) and (B) combined.

The epoxy resin composition may further include various additives, if necessary and as long as the objects of the invention are not impaired. Illustrative examples include flame retardant aids such as antimony trioxide and antimony pentoxide; stress-lowering additives such as thermoplastic resins, thermoplastic elastomers, synthetic organic rubbers, and silicones; waxes such as carnauba wax, higher fatty acids and synthetic waxes; colorants such as carbon black; and halogen trapping agents.

The inventive epoxy resin composition may be prepared as a molding material by combining the epoxy resin, curing agent, inorganic compound, inorganic filler, and optional additives in predetermined proportions, thoroughly mixing these components together on a mixer or other appropriate apparatus, then melting and working the resulting mixture using a hot roll mill, kneader, extruder or the like. The worked mixture is then cooled and solidified, and subsequently ground to a suitable size so as to give a molding material.

The resulting epoxy resin composition can be effectively used for encapsulating various types of semiconductor devices. The method of encapsulation most commonly used is low-pressure transfer molding. The epoxy resin composition of the invention is preferably molded at a temperature of about 150 to 180° C. for a period of about 30 to 180 seconds, followed by post-curing at about 150 to 180° C. for about 2 to 16 hours.

EXAMPLE

Examples of the invention and comparative examples are given below for further illustrating the invention, but are not intended to limit the invention. All parts are by weight. The average particle size is determined by the laser light diffraction method; and the specific surface area is measured by the BET method.

Examples 1 to 10 and Comparative Examples 1 to 3

Epoxy resin compositions for semiconductor encapsulation were prepared by uniformly melt mixing the components shown in Tables 1 and 2 on a hot twin-roll mill, followed by cooling and grinding. The starting materials are shown below.

Inorganic Compounds:

| Designation | Compound | Average particle size | Specific surface area |
|---|---|---|---|
| (1) | $Zn_2SiO_4$ | 0.5 μm | 3.8 m$^2$/g |
| (2) | $ZnCrO_4$ | 0.8 μm | 3.4 m$^2$/g |
| (3) | $ZnFeO_4$ | 1.0 μm | 2.8 m$^2$/g |
| (4) | $ZnMoO_4$ | 0.7 μm | 3.4 m$^2$/g |

Inorganic Filler:
Spherical fused silica (average particle size 20 μm) by Tatsumori K.K.
Flame Retardant Aid:
antimony trioxide by Nippon Seiko K.K.
Curing Accelerator:
triphenyl phosphine by Hokko Chemical K.K.
Parting Agent:
Carnauba wax by Nikko Fine Products K.K.
Colorant:
Denka Black by Denki Kagaku Kogyo K.K.
Silane Coupling Agent:
KBM403 (γ-glycidoxypropyltrimethoxysilane) by Shin-Etsu Chemical Co., Ltd.

TABLE 1

| | | Example | | | | | | |
|---|---|---|---|---|---|---|---|---|
| | | 1 | 2 | 3 | 4 | 5 | 6 | 7 |
| Epoxy resin | (a) | 58.8 | 58.8 | 58.8 | 58.8 | 58.8 | 58.8 | — |
| | (b) | — | — | — | — | — | — | 46.0 |
| | (c) | — | — | — | — | — | — | — |
| Brominated epoxy resin | | 7 | 7 | 7 | 7 | 7 | 7 | 7 |
| Phenolic resin | (d) | 34.2 | 34.2 | 34.2 | 34.2 | 34.2 | 34.2 | — |
| curing agent | (e) | — | — | — | — | — | — | 47.0 |
| | (f) | — | — | — | — | — | — | — |
| Inorganic filler | | 500 | 500 | 500 | 500 | 500 | 500 | 800 |
| Curing accelerator | | 1.0 | 1.0 | 1.0 | 1.0 | 1.0 | 1.0 | 1.0 |
| Inorganic compound | (1) | 5 | 10 | 50 | — | — | — | 10 |
| | (2) | — | — | — | 10 | — | — | — |
| | (3) | — | — | — | — | 10 | — | — |
| | (4) | — | — | — | — | — | 10 | — |
| Antimony trioxide | | 10 | 10 | 10 | 10 | 10 | 10 | 10 |
| Parting agent | | 3 | 3 | 3 | 3 | 3 | 3 | 3 |
| Colorant | | 2 | 2 | 2 | 2 | 2 | 2 | 2 |
| Silane coupling agent | | 1 | 1 | 1 | 1 | 1 | 1 | 1 |

Epoxy Resins:
(a) o-cresol novolac epoxy resin EOCN 1020-55 by Nippon Kayaku Co., Ltd. (epoxy equivalent 200)
(b) biphenyl epoxy resin YX-4000HK by Japan Epoxy Resin Co., Ltd. (epoxy equivalent 190)
(c) biphenyl aralkyl epoxy resin NC-3000 by Nippon Kayaku Co., Ltd. (epoxy equivalent 272)
Flame Retardant:
Brominated epoxy resin BREN-105 by Nippon Kayaku Co., Ltd. (epoxy equivalent 270, bromine content 36 wt %)
Curing Agents:
(d) phenol novolac resin DL-92 by Meiwa Chemical Co., Ltd. (phenolic hydroxyl equivalent 107)
(e) phenol aralkyl resin MEH-7800SS by Meiwa Chemical Co., Ltd. (phenolic hydroxyl equivalent 175)
(f) biphenyl aralkyl type phenolic resin MEH-7851SS by Meiwa Chemical Co., Ltd. (phenolic hydroxyl equivalent 203)

TABLE 2

| | | Example | | | Comparative Example | | |
|---|---|---|---|---|---|---|---|
| | | 8 | 9 | 10 | 1 | 2 | 3 |
| Epoxy resin | (a) | — | — | — | 58.8 | — | — |
| | (b) | 46.0 | — | — | — | 46.0 | — |
| | (c) | — | 50.2 | 50.2 | — | — | 50.2 |
| Brominated epoxy resin | | 7 | 7 | 7 | 7 | 7 | 7 |
| Phenolic resin | (d) | — | — | — | 34.2 | — | — |
| curing agent | (e) | 47.0 | — | — | — | 47.0 | — |
| | (f) | — | 42.8 | 42.8 | — | — | 42.8 |
| Inorganic filler | | 800 | 700 | 700 | 500 | 800 | 700 |
| Curing accelerator | | 1.0 | 1.0 | 1.0 | 1.0 | 1.0 | 1.0 |
| Inorganic compound | (1) | — | 10 | — | — | — | — |
| | (2) | 10 | — | 10 | — | — | — |
| | (3) | — | — | — | — | — | — |
| | (4) | — | — | — | — | — | — |
| Antimony trioxide | | 10 | 10 | 10 | 10 | 10 | 10 |
| Parting agent | | 3 | 3 | 3 | 3 | 3 | 3 |

TABLE 2-continued

|  | Example | | | Comparative Example | | |
|---|---|---|---|---|---|---|
|  | 8 | 9 | 10 | 1 | 2 | 3 |
| Colorant | 2 | 2 | 2 | 2 | 2 | 2 |
| Silane coupling agent | 1 | 1 | 1 | 1 | 1 | 1 |

Properties of these epoxy resin compositions were measured by the following methods. The results are shown in Tables 3 and 4.

(i) Spiral Flow:

Measured by molding at 175° C. and 70 kgf/cm² for a molding time of 90 seconds using a mold in accordance with EMMI standards.

(ii) Gel Time:

The gel time was determined by thinly spreading the composition on a hot plate heated at 175° C., scraping the resin with a spatula, and monitoring the time when the resin was scraped from the plate surface.

(iii) Hardness when Molded:

In accordance with JIS-K6911, a rod measuring 10×4×100 mm was molded from the composition at a temperature of 175° C. and a pressure of 70 kgf/cm² for a time of 90 seconds. The hardness when hot was measured with a Barcol Impressor.

(iv) Migration:

A silicon chip dimensioned 6×6×0.3 mm having aluminum wiring formed thereon and surface coated with SiN was bonded to 100-pin QFP frame (Cu), and the aluminum electrodes on the chip surface were wire bonded to the lead frame using gold wire having a diameter of 25 μm. The epoxy resin composition was then molded over the chip at a temperature of 175° C. and a pressure of 70 kgf/cm² for a time of 90 seconds, and post-cured at 180° C. for 4 hours. The package across which a DC bias voltage of 20 V was applied was left to stand for 500 hours in an atmosphere of 130° C. and RH 85%. The occurrence of copper migration was then observed under a microscope.

TABLE 3

| Test results | Example | | | | | | |
|---|---|---|---|---|---|---|---|
|  | 1 | 2 | 3 | 4 | 5 | 6 | 7 |
| Spiral flow (cm) | 100 | 95 | 90 | 100 | 100 | 100 | 120 |
| Gel time (sec) | 20 | 20 | 20 | 20 | 20 | 20 | 25 |
| Hardness when molded | 80 | 80 | 80 | 80 | 80 | 80 | 75 |
| Cu migration | no | no | no | no | no | no | no |

TABLE 4

| Test results | Example | | | Comparative Example | | |
|---|---|---|---|---|---|---|
|  | 8 | 9 | 10 | 1 | 2 | 3 |
| Spiral flow (cm) | 120 | 110 | 110 | 100 | 120 | 110 |
| Gel time (sec) | 25 | 22 | 22 | 20 | 25 | 22 |
| Hardness when molded | 75 | 80 | 80 | 80 | 75 | 80 |
| Cu migration | no | no | no | occurred | occurred | occurred |

It is seen from the data in Tables 3 and 4 that the semiconductor encapsulating epoxy resin composition of the invention is highly reliable, and cures into a product which is effective for minimizing electrical failure such as defective insulation due to a copper migration phenomenon when used for the encapsulation of a semiconductor device using a copper or copper alloy frame with fine pitch wiring.

A semiconductor device encapsulated with a cured product of the epoxy resin composition has minimized copper migration and good electrical reliability.

Japanese Patent Application No. 2004-160551 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A semiconductor device encapsulated by a method comprising the steps of:

encapsulating said semiconductor device having a copper or copper alloy frame having fine pitch wiring, with an epoxy resin composition comprising (A) an epoxy resin. (B) a curing agent, (C) an inorganic compound, and (D) an inorganic filler, said inorganic compound (C) having the formula (1):

$$M1_xM2_yO_z \qquad (1)$$

wherein each of M1 and M2 is a metal element, at least one of M1 and M2 is a metal element of Group II in the Periodic Table having a second ionization potential of up to 20 eV, x, y and z each are an integer of 1 to 20; and curing said composition on said semiconductor device to encapsulate said semiconductor device.

2. The semiconductor device of claim 1, wherein said inorganic compound (C) is present in an amount of 1 to 100 parts by weight per 100 parts by weight of said epoxy resin (A) and said curing agent (B) combined.

3. The semiconductor device of claim 1, wherein said inorganic compound (C) formula (1) is at least one member selected from the group consisting of $Mg_2SiO_4$, $MgWO_4$, $MgFe_2O_4$, $MgIn_2O_4$, $CaSeO_4$, $Ca_2SiO_4$, $CaTiO_3$, $CaCrO_4$, $CaMoO_4$, $CaWO_4$, $Zn_2SiO_4$, $ZnCrO_4$, $ZnFeO_4$, $ZnMoO_4$, and $SrCrO_4$.

* * * * *